(12) United States Patent
Kum et al.

(10) Patent No.: US 10,123,083 B2
(45) Date of Patent: Nov. 6, 2018

(54) SYSTEMS AND METHODS TO SELECT PROGRAMMING INFORMATION FOR INCLUSION IN INFORMATIONAL DISPLAYS

(71) Applicant: Google Inc., Mountain View, CA (US)

(72) Inventors: Sang-Uok Kum, Sunnyvale, CA (US); Piaoyang Cui, San Jose, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 15/385,341

(22) Filed: Dec. 20, 2016

(65) Prior Publication Data

US 2018/0176646 A1    Jun. 21, 2018

(51) Int. Cl.
| | | |
|---|---|---|
| *H04N 21/4722* | (2011.01) | |
| *H04N 21/45* | (2011.01) | |
| *H04N 21/437* | (2011.01) | |
| *H04N 21/472* | (2011.01) | |
| *H04N 21/482* | (2011.01) | |

(52) U.S. Cl.
CPC ....... *H04N 21/4722* (2013.01); *H04N 21/437* (2013.01); *H04N 21/4524* (2013.01); *H04N 21/47202* (2013.01); *H04N 21/4826* (2013.01)

(58) Field of Classification Search
CPC ............. H04N 21/4722; H04N 21/437; H04N 21/4524; H04N 21/47202; H04N 21/4826
See application file for complete search history.

(56) References Cited

U.S. PATENT DOCUMENTS

| | | | | |
|---|---|---|---|---|
| 7,143,430 B1* | 11/2006 | Fingerman | ......... | H04N 7/17336 725/87 |
| 9,686,032 B2* | 6/2017 | Thomas | ................ | H04H 60/92 |
| 2005/0166223 A1* | 7/2005 | Krasinski | ............... | H04N 7/163 725/35 |
| 2006/0048182 A1* | 3/2006 | Kim | .................... | H04N 5/44543 725/38 |
| 2008/0155613 A1* | 6/2008 | Benya | ................ | H04N 7/17318 725/89 |
| 2010/0205633 A1* | 8/2010 | Kataoka | ............ | H04N 5/44543 725/39 |
| 2011/0131594 A1* | 6/2011 | Jin | ......................... | H04H 60/31 725/9 |
| 2011/0173304 A1* | 7/2011 | Schlack | .............. | H04L 65/4084 709/220 |
| 2011/0264768 A1* | 10/2011 | Walker | .................. | H04N 21/00 709/218 |

(Continued)

*Primary Examiner* — Pinkal R Chokshi
(74) *Attorney, Agent, or Firm* — Dority & Manning, P.A.

(57) ABSTRACT

The present disclosure provides systems and methods that select programming information for inclusion in informational displays. In one example, for a particular instance of content stream associated with a content distributor carrying a version of the program at a particular air time, the information retrieval system can determine whether such instance constitutes local programming or national programming. As one example, the system can determine whether a first version of a program is local programming or national programming based at least in part on a comparison of a first content stream that includes the first version of the program with at least one other content stream that is associated with a same content distributor and also associated with a time zone associated with a user.

17 Claims, 5 Drawing Sheets

(56) References Cited

U.S. PATENT DOCUMENTS

| | | | |
|---|---|---|---|
| 2011/0279311 A1* | 11/2011 | Hamano | G06F 17/30241 |
| | | | 342/357.25 |
| 2012/0278428 A1* | 11/2012 | Harrison | H04N 21/2665 |
| | | | 709/217 |
| 2013/0132999 A1* | 5/2013 | Pandey | H04N 21/4221 |
| | | | 725/35 |
| 2013/0276017 A1* | 10/2013 | Walker | H04N 21/44204 |
| | | | 725/25 |
| 2015/0143069 A1* | 5/2015 | Elsloo | H04L 67/325 |
| | | | 711/167 |
| 2015/0150050 A1* | 5/2015 | Kim | H04N 5/445 |
| | | | 725/40 |
| 2015/0365729 A1* | 12/2015 | Kaya | H04N 21/4826 |
| | | | 725/14 |
| 2016/0066008 A1* | 3/2016 | Gobara | H04N 21/26283 |
| | | | 725/54 |
| 2017/0034585 A1* | 2/2017 | Kim | H04N 21/4826 |
| 2017/0251280 A1* | 8/2017 | Seo | H04N 21/23418 |

* cited by examiner

SYSTEMS AND METHODS TO SELECT PROGRAMMING INFORMATION FOR INCLUSION IN INFORMATIONAL DISPLAYS

FIELD

The present disclosure relates generally to providing programming information to users. More particularly, the present disclosure relates to systems and methods to select programming information for inclusion in informational displays based at least in part on consistency of broadcast across a time zone associated with a user.

BACKGROUND

Programming information can be useful to assist a consumer in identifying currently available programming or programming that will be available for viewing in the future. In one example, a user may have a particular program (e.g., a television show or movie) that the user desires to view or otherwise consume. The user can seek information that describes when such particular program is televised or otherwise available.

Various services currently exist that allow a user to browse or search within programming listings. Typically, these services will provide programming listings and search results thereof based on a time zone associated with the user.

However, even within a particular time zone, programming may not be consistently carried by a content distributor within such time zone. For example, a Los Angeles station of a television network may air a particular soap opera at 2 PM Pacific Standard Time while a San Francisco station of the same network may air the same soap opera at 3 PM Pacific Standard Time.

Thus, if a service provides programming listings based only on the time zone of the user, then there is a risk that a particular user may receive programming information that is incorrect or otherwise inapplicable to such user. For example, a user that is located in San Francisco may be incorrectly informed that the particular soap opera is available to them at 2 PM.

Therefore, systems and methods that prevent an informational display that is based on the user's time zone from including information that is incorrect or otherwise inapplicable to the user are desired.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to select national programming for inclusion in informational displays. The method includes identifying, by one or more computing devices, a program to be included in an informational display presented to a user. The method includes obtaining, by the one or more computing devices, at least a first listing for the program. The first listing indicates a first air time and a first content stream on which a first version of the program will be provided at the first air time. The first content stream is associated with a first content distributor. The first content stream is associated with a time zone associated with the user. The method includes determining, by the one or more computing devices, whether the first version of the program is local programming or national programming based at least in part on a comparison of the first content stream with at least one other content stream that is associated with the first content distributor and the time zone associated with the user. The method includes, in response to a determination that the first version of the program is national programming, providing, by the one or more computing devices, at least a portion of the first listing for inclusion within the informational display presented to the user.

Another example aspect of the present disclosure is directed to a computer system to select programming for inclusion in informational displays based on user time zone. The computer system includes one or more processors and one or more non-transitory computer-readable media that collectively store instructions that, when executed by the one or more processors, cause the computer system to perform operations. The operations include identifying a program for inclusion in an informational display. The operations include obtaining a plurality of listings for the program. Each of the plurality of listings indicates at least an air time, a content stream, and a content distributor. The operations include identifying one or more combinations of air time and content distributor indicated by the plurality of listings. The operations include identifying, for each of the one or more combinations of air time and content distributor, a number of content streams associated with the corresponding content distributor in a time zone associated with the user. The operations include determining, for each of the one or more combinations, a percentage of the number of content streams associated with the corresponding content distributor that include the program at the corresponding air time. The operations include determining, for each of the one or more combinations, whether to include such combination in the informational display based at least in part on the percentage of the number of content streams associated with the corresponding content distributor in the time zone that include the program at the corresponding air time.

Another example aspect of the present disclosure is directed to at least one non-transitory computer-readable medium that stores instructions that, when executed by one or more processors, cause a computing system to perform operations. The operations include identifying a program that is responsive to a search query from a user. The operations include obtaining a plurality of listings for the program. Each listing indicates a corresponding air time and a corresponding content stream that is associated with one of a plurality of content distributors. The operations include determining, for each content distributor, a number of content streams associated with the time zone associated with the user. The operations include determining, for each of one or more combinations of content distributor and air time, based on the plurality of listings, a percentage of the number of content streams that include the program at the corresponding air time. The operations include selecting at least one of the one or more combinations of content distributor and air time for inclusion in a search results page based at least in part on the respective percentages determined for the one or more combinations of content distributor and air time.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
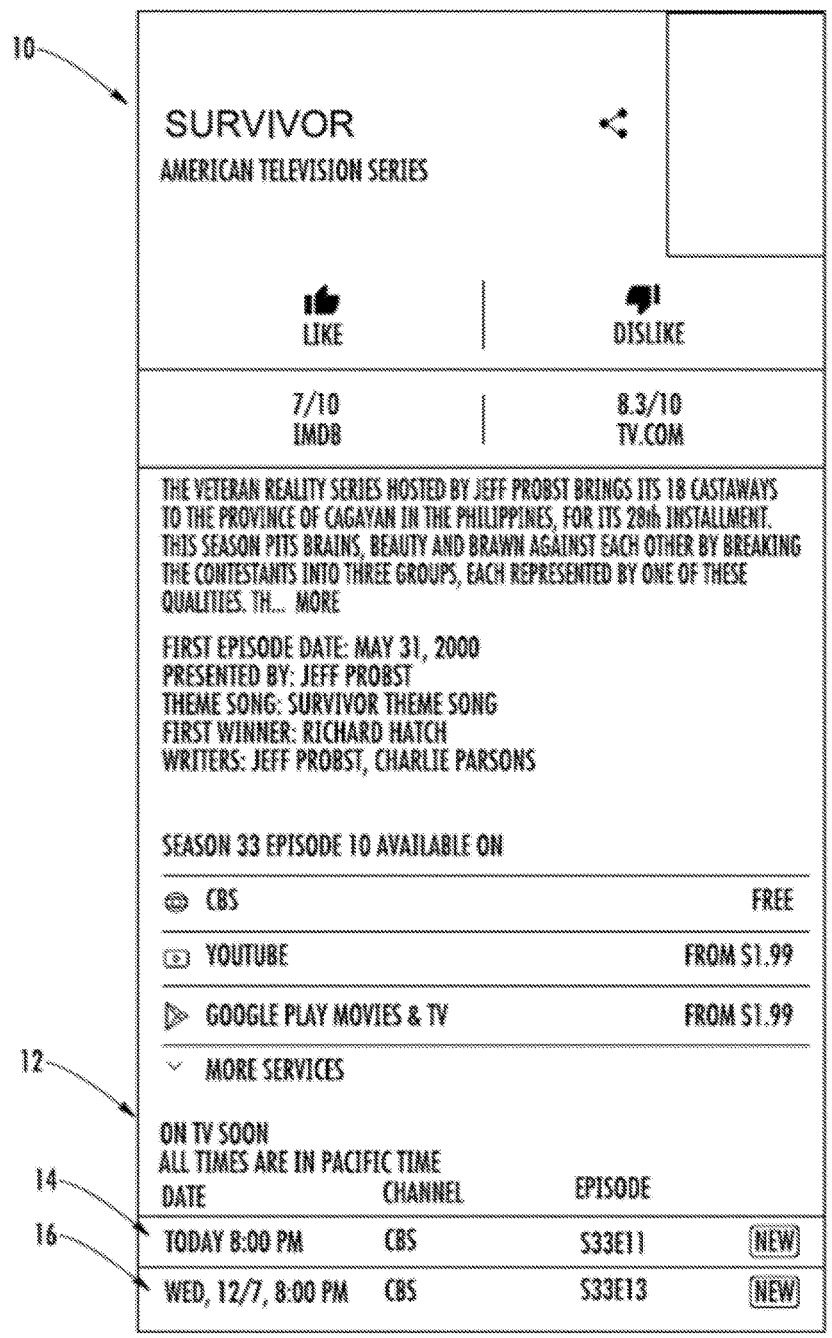
FIG. 1 depicts an example informational display that includes programming information according to example embodiments of the present disclosure.

Generally, the present disclosure is directed to systems and methods to select programming information for inclusion in informational displays. In one example, a user can enter a search query that requests information regarding a particular program. In response, an information retrieval system can return a search results page that includes an informational display that, for example, describes content distributors and times at which the program will be broadcast or otherwise aired. In particular, the information included in the informational display can be specific to a time zone associated with the user.

However, to ensure that the broadcast information included in the informational display does not include incorrect information or information that is inapplicable to the user, the information retrieval system can filter out or otherwise not include information that pertains to local programming or other programming that is not consistently aired by the content distributor across the entire time zone. Stated differently, for a particular instance of a content distributor airing a version of the program at a particular air time, the information retrieval system can determine whether such instance constitutes local programming or national programming. As one example, a system can determine whether a first version of a program is local programming or national programming based at least in part on a comparison of a first content stream that includes the first version of the program with at least one other content stream that is associated with a same content distributor and also associated with a time zone associated with a user.

In some implementations, the informational display can be controlled to include only information about instances of national programming for the program. Thus, for example, by excluding local programming or other programming that is not consistently aired by the content distributor across the entire time zone at the same air time, an informational display that is based on the user's time zone rather than more granular location (e.g., postal code) does not show information that is incorrect or otherwise inapplicable to the user.

More particularly, the systems and methods of the present disclosure can be applied to select programming information for inclusion in informational displays. As described above, one example instance in which information displays can be generated and provided to the user is within the context of a search results page that is provided (e.g., served) in response to a search query provided by a user that requests information about a particular program. For example, the informational display can be provided in the form of or as a portion of a knowledge panel that provides general information about the particular program.

However, the informational displays described herein can be used in other contexts in addition or alternatively to the user-prompted search results context. For example, informational displays can be provided to a user (e.g., without requiring a user prompt or search query) by a personal assistant application (e.g., an application that includes or leverages an artificial intelligence-based assistant). For example, based on context or other user-exhibited patterns, the personal assistant application can automatically surface programming information within an informational display. As another example, informational displays can be provided to a user (e.g., without requiring a user prompt or search query) by a dashboard application that provides, for example, general daily information when accessed by the user. Regardless of the particular context in which the informational display is provided, the present disclosure provides systems and methods that can select programming information regarding a particular program for inclusion in informational displays.

In some implementations, once a particular program about which information is sought has been identified, the systems and methods of the present disclosure can obtain one or more listings for the program. For example, the one or more listings can be retrieved from one or more databases that provide listings for various content distributors. The listings retrieved from the one or more databases can be listings that describe future instances in which the particular program will be provided. In particular, in some implementations, each listing can indicate a respective air time and a respective content stream on which a respective version of the program will be aired at the respective air time. Each respective content stream can be associated with one of a plurality of different content distributors.

More particularly, as used herein, the term "content distributor" includes a distributor of programming content. As examples, content distributors include television networks such as ABC, CBS, NBC, FOX, PBS, CW, Telemundo, Univision, HBO, AMC, ESPN, ESPN2, etc. As another example, content distributors can further include Internet-based content distributors that broadcast or otherwise provide linearly streaming content via one or more content streams available over the Internet. As yet another example, content distributors can include radio networks such as, for example, NPR.

In some instances, a content distributor can have a plurality of stations associated therewith. As used herein, the term "station" includes a transmitter of content over a region. As an example, KABC-TV is an ABC owned-and-operated television station located in Los Angeles, Calif. As another example, KOMO is an ABC-affiliated television station located in Seattle, Wash. Likewise, a radio content distributor may have a plurality of associated stations that respectively broadcast over a plurality of different locations.

Furthermore, content distributors and/or their associated stations can have one or more content streams associated therewith. As used herein, the term "content stream" includes a stream of content that is accessible by a user. For example, a television station may have multiple content streams. As an example, a single television station may have both a standard definition content stream and a high definition content stream. An Internet-based content distributor may broadcast any number of content streams. In other instances, a station may have a single content stream.

Thus, a particular content distributor may have a number of different content streams that carry the content distributor's content. In many instances, such different content streams will be associated with different locations. As such, each content stream can be associated with one or more time zones. Such association can be based on the time zones in which such content streams are available for consumption. For example, a high definition content stream broadcast by KABC-TV can be associated with the Pacific United States time zone since it is available in the Los Angeles, Calif. market. In some implementations of the present disclosure, a content stream is permitted to be associated with only a single time zone that such content stream most primarily services.

As used herein, the term "program" generally refers to content that can be provided via a content stream. For example, a program can include a serialized program, a special program (e.g., a "Christmas Special" or sporting event broadcast), a movie, or other content. A particular program can have one or multiple versions. For example, a movie can have a single version or multiple versions (e.g., "extended edition" version vs. theatrical version). A television show or radio show can have multiple versions (e.g., different episodes of the show).

Further, as used herein, the terms "broadcast" and "air" do not require or exclusively refer to traditional over the air transmission of content, but instead can also refer to airing or broadcasting of content via cable-based content streams, satellite-based content streams, Internet-based content streams or other content distribution technologies.

Thus, in response to a call for information regarding a particular program, the systems and methods of the present disclosure can obtain one or more listings for the program that indicate a respective air time and a respective content stream on which a respective version of the program will be provided at the respective air time. As described, each respective content stream can be associated with one of a plurality of different content distributors and a time zone.

The systems and methods of the present disclosure (e.g., an information retrieval system of the present disclosure) can analyze the listings to identify or otherwise select programming information for inclusion in the information display. In particular, in some implementations, for each instance of a content distributor airing a version of the program at a particular air time, the information retrieval system can determine whether such instance constitutes local programming or national programming. In some implementations, only information for national programming is selected for inclusion in the informational display.

In some implementations, the information retrieval system can consider each listing individually to determine whether such listing describes local or national programming. In other implementations, the information retrieval system can sort the obtained listings based on one or more factors. For example, in some implementations, the information retrieval system can sort the obtained listings according to combinations of air time and content distributor. Thus, all listings that share the same respective combination of air time and content distributor can be grouped together to form one or more groups of listings. The information retrieval system can separately consider each of the one or more groups of listings to determine whether the corresponding airing of the program is local programming or national programming.

As one example, in some implementations, a first listing might indicate that a first version of the program will be provided on a first content stream at a first air time, where the first content stream is associated with a first content distributor. According to an aspect of the present disclosure, the information retrieval system can determine whether the airing described by the first listing is local or national programming based at least in part a comparison of the first content stream with at least one other content stream that is associated with the first content distributor in the time zone associated with the user.

In particular, as one example, to compare the first content stream with at least one other content stream, the information retrieval system can first identify a first number of content streams associated with the first content distributor in the time zone associated with the user. For example, if the first content stream is a high definition content stream associated with a CBS affiliate in the Pacific Time Zone, then additional content streams associated with CBS and the Pacific Time Zone can be identified. For example, in some implementations, the information retrieval system can identify all content streams that are associated with the first content distributor in the time zone associated with the user.

In some implementations, the information retrieval system can identify at least a minimum number of content streams associated with the first content distributor in the time zone associated with the user. In one example, the minimum of content streams can be pre-selected. For example, the minimum number of content streams can be retrieved from a whitelist. In another example, the information retrieval system can select content streams until at least the minimum number of content streams have been selected. For example, in some implementations, content streams can be selected on the basis of importance values. For example, the importance value for each content stream can be generated based on various factors including, for example, coverage area size of the content stream; viewership size of the content stream; consumer market size of the content stream (e.g., Los Angeles, Calif. is a larger market than Eureka, Calif.); or other factors.

After identifying the first number of content streams associated with the same content distributor and time zone, the information retrieval system can determine a percentage of such first number of content streams that include the first version of the program at the first air time. Thus, the information retrieval system can determine whether or not each of the first number of content streams is airing the same first version of the program as the first content stream identified by the first listing.

The information retrieval system can determine whether the first version of the program is local programming or national programming based at least in part on the percentage of the first number of content streams that include the first version of the program at the first air time. For example, in some implementations, the information retrieval system can compare the percentage to a threshold value. If the percentage is greater than the threshold value, the information retrieval system can determine that the first version of the program is national programming. However, if the percentage is less than the threshold value, the information retrieval system can determine that the first version of the program is local programming.

As described above, in some implementations, in response to a determination that the first version of the program is national programming, the information retrieval system can provide at least a portion of the first listing (e.g., the first air time and the first content distributor) for inclusion within the informational display presented to the user. Likewise, in some implementations, information regarding local programming will not be provided for inclusion within the informational display. In some implementations, a maximum of five listings or discrete entries of programming information (e.g., content distributor and air time) are selected for inclusion in the informational display.

In some implementations, the threshold value can be 100%. Thus, if any of the identified first number of content streams for the first content distributor in the time zone associated with the user are not simultaneously airing the first version of the program, then the first version of the program can be designated local programming. In other implementations, different threshold values can be used (e.g., 75%, 50%, etc.) In some implementations, the threshold value used in each instance can be determined based at least in part on the first number of content streams associated with the first content distributor. For example, if more content streams are identified, then the threshold value can be relaxed, while if fewer content streams are identified, then the threshold value can be stricter (or vice versa).

The process described above can be performed for each listing individually or for each group of listings that have been grouped according to content distributor and air time.

According to another aspect of the present disclosure, in some implementations, prior to analyzing the listings to identify national programming, the information retrieval system can filter the plurality of listings to retain only listings that indicate over the air content streams. For example, in some implementations, listings that indicate cable content streams (e.g., content streams associated with a cable content distributor) can be removed. In other implementations, cable content streams or other non-over the air content streams are not removed but are assumed to carry national programming. In yet further implementations, cable content streams or other non-over the air content streams are not removed but the number of content streams for the corresponding cable content distributor is not required to meet the minimum number of content streams or is otherwise set to some smaller number.

According to yet another aspect of the present disclosure, in some implementations, the information retrieval system can order the plurality of listings based on importance. For example, listings that indicate that the corresponding program is a new episode can be regarded as more important than listings that indicate that the corresponding program is a re-run episode. More particularly, in some implementations, each listing can further include repeat broadcast information that indicates whether the corresponding program is a new broadcast or a repeat broadcast. The information retrieval system can order the listings (or the groups of listings) based at least in part on the repeat broadcast information such that new broadcasts are ordered before repeat broadcasts. The information retrieval system can consider listings (or groups of listings) for inclusion in the informational display according to the order, wherein only up to a maximum number of combinations are selected for inclusion in the informational display. For example, in some implementations, a maximum of five listings or discrete entries of programming information (e.g., content distributor and air time) are selected for inclusion in the informational display. By ordering based on importance (e.g., repeat broadcast information) prior to selection, the most important (e.g., new) listings can be selected for inclusion in the informational display.

Thus, the present disclosure provides systems and methods to select programming information for inclusion in informational displays. In particular, to ensure that the broadcast information included in the informational display does not include incorrect information or information that is inapplicable to the user, the systems and methods of the present disclosure can filter out or otherwise not include information pertaining to local programming or other programming that is not consistently aired by the content distributor across the entire time zone. Therefore, the systems and methods of the present disclosure provide a technical solution that prevents an informational display that is based on the user's time zone from including information that is incorrect or otherwise inapplicable to the user. As such, a technical benefit is provided which can be summarized as improved computer-generated informational displays.

With reference now to the Figures, example embodiments of the present disclosure will be discussed in further detail.

FIG. 1 depicts an example informational display 10 that includes programming information 12 according to example embodiments of the present disclosure. The example informational display 10 can be presented to a user to provide information to the user about a particular program such as, for example, a particular television program.

In one example, the informational display 10 can be presented in the form of or as a portion of a knowledge panel. For example, the knowledge panel can be included in a search results page that is presented to the user in response to a search query entered by the user. Thus, for example, a user can enter a search query that is relevant to or otherwise requests information about a particular program. In response, the systems and methods of the present disclosure can select information including, for example, programming information, to include in an informational display that is provided within the search results page displayed in response to the search query. Knowledge panels or other informational displays can also be provided automatically (e.g., absent a specific request or query by a user).

Referring again to FIG. 1, according to an aspect of the present disclosure, the informational display 10 can include the programming information 12. The programming information 12 can include various types of information that describe to a user when the particular program will be available to the user. As examples, the programming information 12 can include one or more entries that describe upcoming opportunities at which the program will be available to the user.

In particular, referring to FIG. 1, the example programming information 12 includes a first entry 14 and a second entry 16. Each of the entries 14 and 16 includes the following information: airtime (e.g., date and time), identification of the content distributor and/or content stream (e.g., here referred to generally as "channel"), and identification of the aired version of the program (e.g., identification of a particular episode of a serialized program).

In some implementations, as further illustrated in FIG. 1, the programming information 12 can indicate, for each entry 14 and 16, whether the respective version of the program identified by such entry is a new broadcast or a repeat broadcast. In some implementations, the absence of a "new" icon can indicate that the respective version of the program is a repeat broadcast.

The informational display 10 of FIG. 1 is provided as one example only. Other informational displays with different formats, styles, designs, and/or information contents can be used by the systems and methods of the present disclosure. Likewise, the programming information 12 included in the display 10 is provided as an example only. Other programming information with different formats, styles, designs, and/or information contents can be used by the systems and methods of the present disclosure. For example, in some implementations, programming information can be provided in an interactive visual timeline that allows the user to explore upcoming broadcasts of the program.

Figure 2:
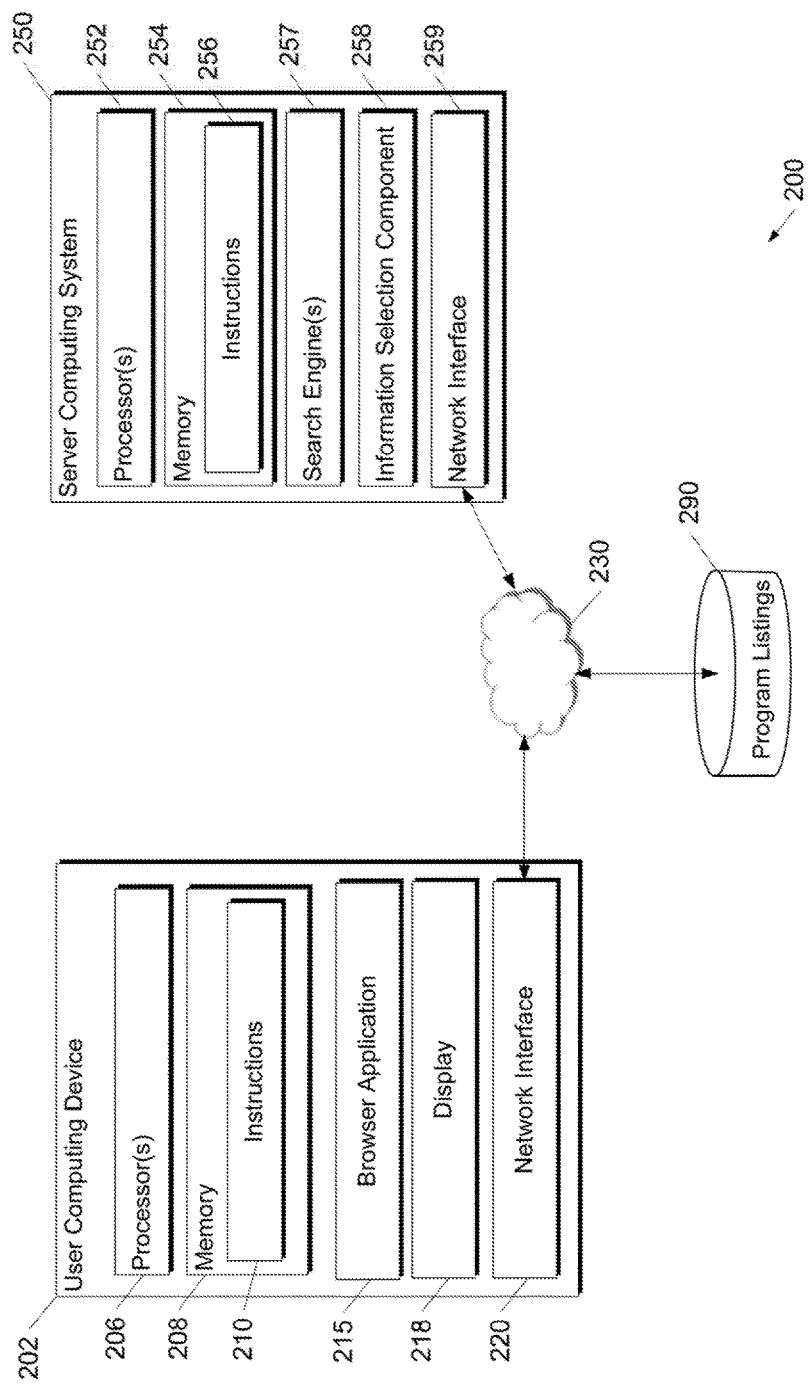
FIG. 2 depicts a block diagram of an example computing system according to example embodiments of the present disclosure.

FIG. 2 depicts a block diagram an example computing system 200 according to example embodiments of the present disclosure. The system 200 includes a user computing device 202 and a server computing system 250 that are communicatively coupled over a network 230.

The user computing device 202 can be any form of computing device, such as a laptop computer, desktop computer, smartphone, tablet, wearable computing device (e.g., computing device embedded in a pair of eyeglasses, a wristband, a necklace, etc.), handheld computing device, embedded computing device (e.g., in a vehicle), gaming console, etc.

The user computing device 202 includes one or more processors 206 and a memory 208. The one or more processors 206 can be any form of processing device, including, for example, a processing unit, a microprocessor, a controller, a microcontroller, an application specific integrated circuit, etc. The memory 208 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 208 can store one or more sets of instructions 210 that, when executed by the user computing device 202, cause the user computing device 202 to perform operations consistent with the present disclosure.

The user computing device 202 includes a browser application 215. The browser application can be implemented by the one or more processors 206. The browser application 215 can retrieve, present, and traverse information resources from the World Wide Web. The browser application 215 can be a mobile web browser.

The browser application 215 includes computer logic utilized to provide desired functionality. The browser application 215 can be implemented in hardware, firmware, and/or software controlling a general purpose processor. For example, in some implementations, the browser application 215 includes program files stored on a storage device, loaded into a memory and executed by one or more processors. In other implementations, the browser application 215 includes one or more sets of computer-executable instructions that are stored in a tangible computer-readable storage medium such as RAM hard disk or optical or magnetic media.

The user computing device 202 includes a display 218. The display 218 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 218 can also be touch-sensitive. For example, the display can be a capacitive touchscreen, a resistive touchscreen, or other touch-sensitive technologies.

The user computing device 202 can further include a network interface 220. The network interface 220 can enable communications over a network 230. The network interface 220 can include any number of components to provide networked communications (e.g., transceivers, antennas, controllers, cards, etc.).

In some implementations, the user computing device 202 can communicatively connect to a server computing system 250 over the network 230. The server computing system 250 can include one or more processors 252 and a memory 254. The one or more processors 252 can be any form of processing device, including, for example, a processing unit, a microprocessor, a controller, a microcontroller, an application specific integrated circuit, etc. The memory 254 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 254 can store one or more sets of instructions 256 that, when executed by the server computing system 250, cause the server computing system 250 to perform operations consistent with the present disclosure.

In some implementations, the server computing system 250 includes or is otherwise implemented by one or more server computing devices. In instances in which the server computing system 250 includes plural server computing devices, such server computing devices can operate according to sequential computing architectures, parallel computing architectures, or some combination thereof.

The server computing system 250 can include one or more search engines 257. Search engines 257 can include a knowledge graph search tool, a shopping search tool, a search index, a map search tool, a news search tool, a video search tool, an image search tool, or other search engines or tools. The search engines 257 can locate or otherwise retrieve information (e.g., programming information) that is relevant to a query or other request for information.

As an example, the server computing system 250 can be communicatively coupled to and can retrieve information from a database of program listings 290. The database of program listings 290 can be one database or can be multiple databases. The database of program listings 290 can store or otherwise provide a plurality of listings for content distributors and associated content streams. By searching the database of program listings 290 one or more listings can be retrieved for a particular program. The listings retrieved from the database of program listings 290 can be listings that describe future instances in which the particular program will be provided. In particular, in some implementations, each listing can indicate a respective air time and a respective content stream on which a respective version of the program will be aired at the respective air time.

The server computing system 250 can further include an information selection component 258. The server computing system 250 can implement the information selection component 258 to select information (e.g., programming information) for inclusion in an informational display. For example, server computing system 250 can implement the information selection component 258 to implement some or all of method 300 of FIG. 3, method 400 of FIGS. 4A-B, and/or one or more other aspects of the present disclosure.

The information selection component 258 includes computer logic utilized to provide desired functionality. The information selection component 258 can be implemented in hardware, firmware, and/or software controlling a general purpose processor. For example, in some implementations, the information selection component 258 includes program files stored on a storage device, loaded into a memory and executed by one or more processors. In other implementations, the information selection component 258 includes one or more sets of computer-executable instructions that are stored in a tangible computer-readable storage medium such as RAM hard disk or optical or magnetic media.

The server computing system 250 can further include a network interface 259. The network interface 259 can enable communications over the network 230. The network interface 259 can include any number of components to provide networked communications (e.g., transceivers, antennas, controllers, cards, etc.).

The network 230 can be any type of communications network, such as a local area network (e.g., intranet), wide area network (e.g., Internet), or some combination thereof and can include any number of wired or wireless links. In general, communication between the server computing system 250 and the user computing device 202 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing system 250 can communicate with the user computing device 202 over network 230 by sending and receiving data.

Further, any of the processes, operations, programs, applications, components, or instructions described and/or illustrated as being stored at or performed by the server computing system 250 can instead be stored at or performed by the user computing device 202 in whole or in part, and vice versa. For example, the information selection component 258 can be included in and/or implemented by the user computing device 202.

Figure 3:
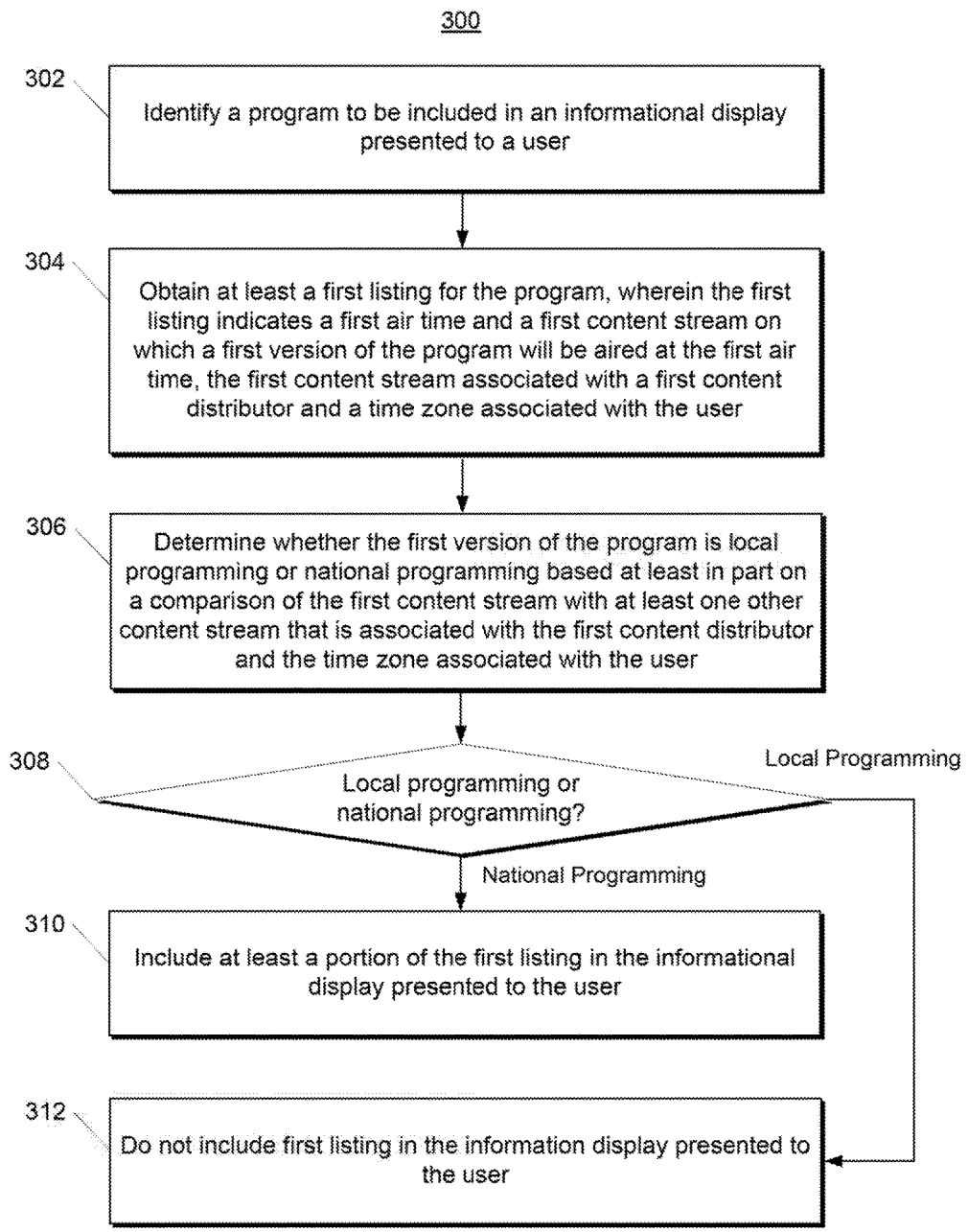
FIG. 3 depicts a flow chart diagram of an example method to select programming information according to example embodiments of the present disclosure.

FIG. 3 depicts a flow chart diagram of an example method 300 to select programming information according to example embodiments of the present disclosure.

At 302, a computing system identifies a program to be included in an informational display presented to a user. In one example, a user can enter a search query that requests information regarding a particular program. For example, at 302, a component of a search engine can interpret the search query entered by the user to identify the program. As other examples, a personal assistant application and/or a dashboard application can identify a program for which information is sought and request information about the program from an information retrieval service.

At 304, the computing system obtains at least a first listing for the program. The first listing indicates a first air time and a first content stream on which a first version of the program will be aired at the first air time. The first content stream is associated with a first content distributor and with a time zone associated with the user. As an example, the computing system can obtain the first listing from a database of program listings. The computing system can determine the time zone associated with the user from a number of data sources including, for example, the user's profile, the user's Internet protocol address, location updates from the user's computing device, or any other data sources or techniques.

At 306, the computing system determines whether the first version of the program is local programming or national programming based at least in part on a comparison of the first content stream with at least one other content stream that is associated with the first content distributor and the first time zone associated with the user.

In particular, as one example, to compare the first content stream with at least one other content stream at 306, the computing system can first identify a first number of content streams associated with the first content distributor in the time zone associated with the user. For example, if the first content stream is a high definition content stream associated with a CBS affiliate in the Pacific Time Zone, then additional content streams associated with CBS and the Pacific Time Zone can be identified. For example, in some implementations, the computing system can identify all content streams that are associated with the first content distributor in the time zone associated with the user.

In some implementations, the computing system can identify at least a minimum number of content streams associated with the first content distributor in the time zone associated with the user. In one example, the minimum of content streams can be pre-selected. For example, the minimum number of content streams can be retrieved from a whitelist.

In another example, at 306, the computing system can select content streams until at least the minimum number of content streams have been selected. For example, in some implementations, content streams can be selected on the basis of importance values. For example, the importance value for each content stream can be generated based on various factors including, for example, coverage area size of the content stream; viewership size of the content stream; consumer market size of the content stream (e.g., Los Angeles, Calif. is a larger market than Eureka, Calif.); or other factors.

After identifying the first number of content streams associated with the same content distributor and time zone, the computing system can determine a percentage of such first number of content streams that include the first version of the program at the first air time. Thus, the computing system can determine whether or not each of the first number of content streams is airing the same first version of the program as the first content stream identified by the first listing.

The computing system can determine whether the first version of the program is local programming or national programming at 306 based at least in part on the percentage of the first number of content streams that include the first version of the program at the first air time. For example, in some implementations, the computing system can compare the percentage to a threshold value. If the percentage is greater than the threshold value, the computing system can determine that the first version of the program is national programming. However, if the percentage is less than the threshold value, the computing system can determine that the first version of the program is local programming.

In some implementations, the threshold value can be 100%. Thus, if any of the identified first number of content streams for the first content distributor in the time zone associated with the user are not simultaneously airing the first version of the program, then the first version of the program can be designated local programming. In other implementations, different threshold values can be used (e.g., 75%, 50%, etc.) In some implementations, the threshold value used in each instance can be determined based at least in part on the first number of content streams associated with the first content distributor. For example, if more content streams are identified, then the threshold value can be relaxed, while if fewer content streams are identified, then the threshold value can be stricter (or vice versa).

At 308, it is determined whether the first version of the program is local programming or national programming. For example, the determination made at 306 can be effectuated at 308. If it is determined at 308 that the first version of the program has been determined to be national programming, then method 300 proceeds to 310. However, if it is determined at 308 that the first version of the program has been determined to be local programming, then method 300 proceeds to 312.

At 310, the computing system includes at least a portion of the first listing in the informational display presented to the user. For example, the computing system can include a description of the first content distributor and the first air time of the first listing within the informational display. In some implementations, a maximum of five listings or discrete entries of programming information (e.g., content distributor and air time) are selected for inclusion in the informational display.

However at 312, the computing system does not include the first listing in the informational display presented to the user. Thus, since the first listing has been determined to describe local programming and, therefore, will not be shown consistently across the time zone of the user, the first listing will not be included in the informational display. In such fashion, information that is inapplicable to the user is prevented from appearing in the informational display.

Figure 4A:
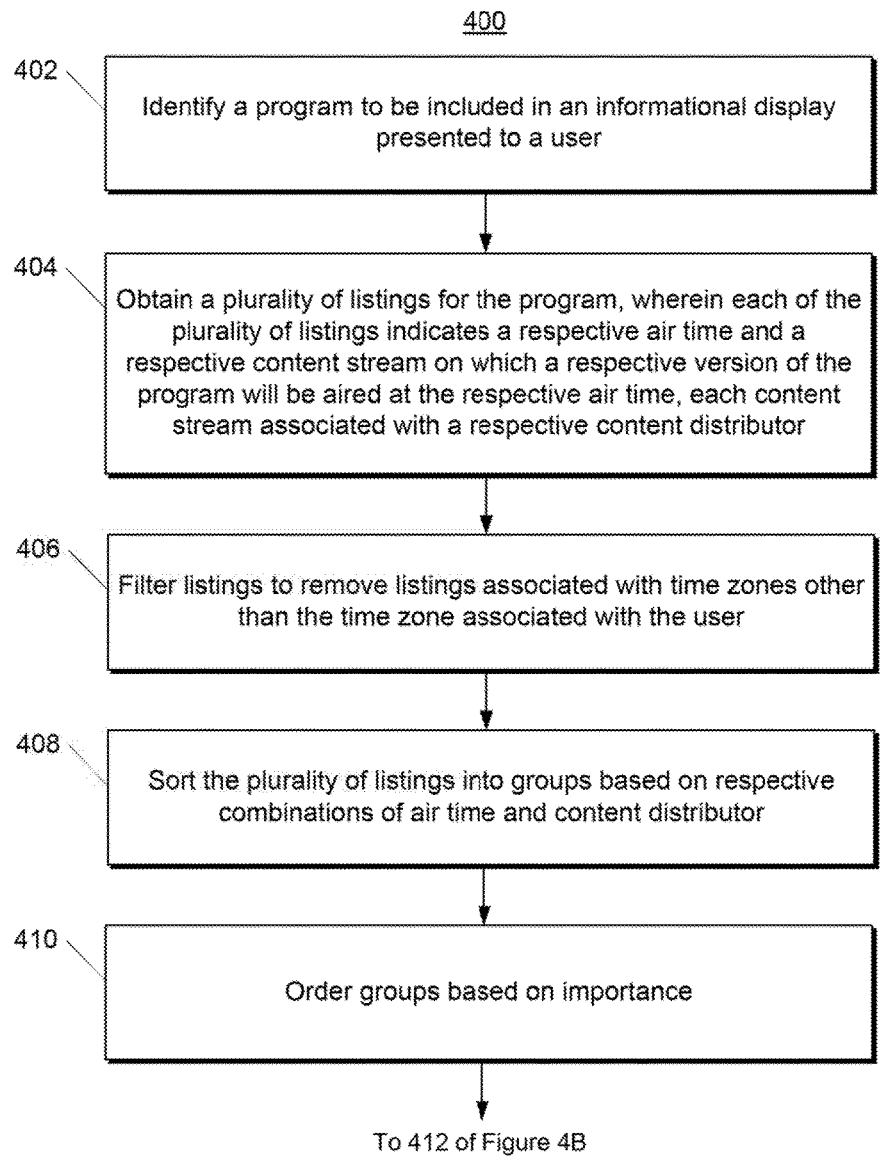
FIGS. 4A and 4B depict a flow chart diagram of an example method to select programming information according to example embodiments of the present disclosure.
Figure 4B:
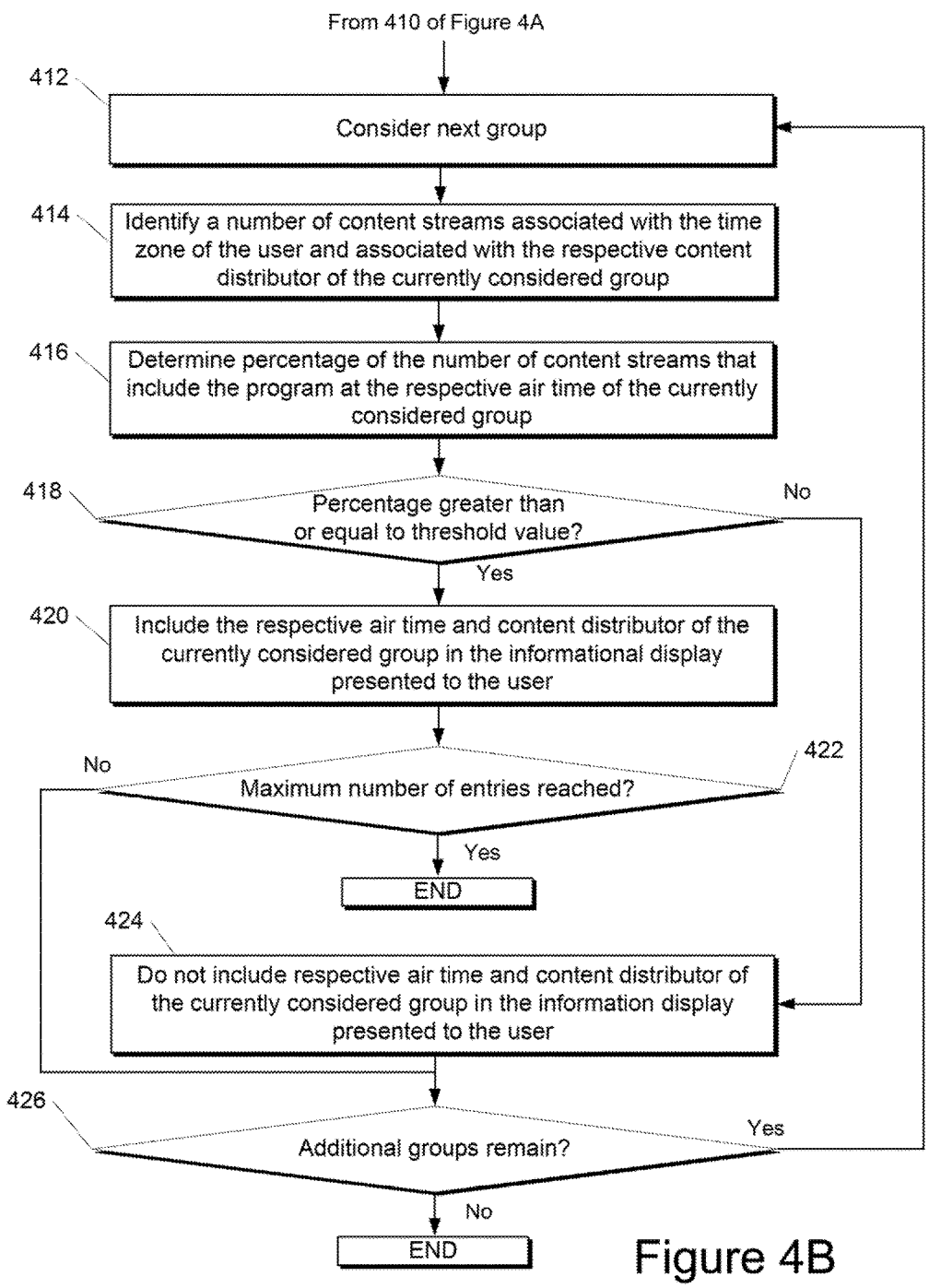

FIGS. 4A and 4B depict a flow chart diagram of an example method 400 to select programming information according to example embodiments of the present disclosure.

Referring first to FIG. 4A, at 402, a computing system identifies a program to be included in an informational display presented to a user. In one example, a user can enter a search query that requests information regarding a particular program. For example, a component of a search engine can interpret the search query entered by the user. As other examples, a personal assistant application and/or a dashboard application can identify a program for which information is sought and request information about the program from an information retrieval service.

At 404, the computing system obtains a plurality of listings for the program. Each of the plurality of listings indicates a respective air time and a respective content stream on which a respective version of the program will be aired at the respective air time. Each content stream is associated with a respective content distributor.

As an example, the computing system can obtain the plurality of listings for the program from a database of program listings. In some implementations, only listings that are provided for a threshold number of upcoming days (e.g., include an air time within the next week) are obtained. In some implementations, the computing system obtains listings until a maximum number of listings is reached.

At 406, the computing system filters the plurality of listings to remove listings associated with time zones other than the time zone associated with the user. The computing system can determine the time zone associated with the user from a number of data sources including, for example, the user's profile, the user's Internet protocol address, location updates from the user's computing device, or any other data sources or techniques.

At 408, the computing system sorts the plurality of listings into groups based on respective combinations of air time and content distributor. Thus, all listings that share the same respective combination of air time and content distributor can be grouped together to form one or more groups of listings. The computing system can separately consider each of the one or more groups of listings to determine whether the corresponding airing of the program is local programming or national programming.

At 410, the computing system orders the plurality of groups based on importance. For example, listings that indicate that the corresponding program is a new broadcast can be regarded as more important than listings that indicate that the corresponding program is a repeat broadcast. More particularly, in some implementations, each listing can further include repeat broadcast information that indicates whether the corresponding program is a new broadcast or a repeat broadcast. The computing system can order the listings (or the groups of listings) based at least in part on the repeat broadcast information such that new broadcasts are ordered before repeat broadcasts. The computing system can consider listings (or groups of listings) for inclusion in the informational display according to the order.

In some implementations, only up to a maximum number of combinations are selected for inclusion in the informational display. For example, in some implementations, a maximum of five listings or discrete entries of programming information (e.g., content distributor and air time) are selected for inclusion in the informational display. By ordering at 410 based on importance (e.g., repeat broadcast information) prior to selection, the computing system can select the most important (e.g., new) listings for inclusion in the informational display. After 410, method 400 proceeds to block 412 of FIG. 4B.

Referring now to FIG. 4B, at 412, the computing system considers the next group. For example, at the first instance of block 412, the computing system will consider the first group according to the order determined at block 410 of FIG. 4A. In subsequent instances of block 412, the computing system will consider the next group according to the order determined at block 410.

At 414, the computing system identifies a number of content streams associated with the time zone of the user and associated with the respective content distributor of the currently considered group. For example, if the respective content distributor of the currently considered group is CBS and the user is located in the Pacific Time Zone, then additional content streams associated with CBS and the Pacific Time Zone can be identified. For example, in some implementations, the computing system can identify all content streams that are associated with the first content distributor in the time zone associated with the user. For example, such information can be retrieved from a database.

In some implementations, the computing system can identify at least a minimum number of content streams associated with the first content distributor in the time zone associated with the user. In one example, the minimum of content streams can be pre-selected. For example, the minimum number of content streams can be retrieved from a whitelist.

In another example, the computing system can select content streams until at least the minimum number of content streams have been selected. For example, in some implementations, content streams can be selected on the basis of importance values. For example, the importance value for each content stream can be generated based on various factors including, for example, coverage area size of the content stream; viewership size of the content stream; consumer market size of the content stream (e.g., Los Angeles, Calif. is a larger market than Eureka, Calif.); or other factors.

At 416, the computing system determines a percentage of the number of content streams that include the program at the respective air time of the currently considered group. Thus, the computing system can determine whether or not each of the first number of content streams is airing the same first version of the program as the first content stream identified by the first listing.

At 418, the computing system determines whether the percentage is greater than or equal to a threshold value. In some implementations, the threshold value can be 100%. Thus, if any of the identified first number of content streams for the first content distributor in the time zone associated with the user are not simultaneously airing the first version of the program, then the first version of the program can be designated local programming. In other implementations, different threshold values can be used (e.g., 75%, 50%, etc.)

In some implementations, the threshold value used in each instance can be determined based at least in part on the first number of content streams associated with the first content distributor. For example, if more content streams are identified, then the threshold value can be relaxed, while if fewer content streams are identified, then the threshold value can be stricter (or vice versa).

If it is determined at 418 that the percentage is greater than the threshold value then method 400 proceeds to 420. At 420, the computing system includes the respective airtime and content distributor of the currently considered group in the informational display presented to the user.

At 422, the computing system determines whether a maximum number of entries has been reached. For example, in some implementations, only a maximum number of entries can be included in the informational display. For example, the maximum number can equal 5 or other numbers.

If it is determined at 422 that the maximum number of entries has been reached, then method 400 will end. However, if it is determined at 422 that the maximum number of entries has not been reached, then method 400 will proceed to 426.

Referring again to block 418, if it is determined that the percentage is less than the threshold value then method 400 proceeds to 424. At 424, the computing system does not include the first listing in the information display presented to the user. After 424, method 400 proceeds to 426.

At 426, the computing system determines whether additional groups remain. If it is determined at 426 that additional groups do not remain, then method 400 ends. However, if it is determined at 426 that additional groups do remain, then method 400 can return to 412 and consider the next group.

Thus, for example, portions of method 400 can be iteratively performed in a group-wise fashion until all groups are considered or the maximum number of entries has been reached. In other implementations, instead of grouping listings based on combination of air time and content distributor, individual listings can be individually considered but screened or filtered to prevent duplicate entries from appearing in the informational display.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 3 and 4A-B respectively depict steps performed in a particular order for purposes of illustration and discussion, the methods of the present disclosure are not limited to the particularly illustrated order or arrangement. The various steps of the methods 300 and 400 can be omitted, rearranged, combined, and/or adapted in various ways without deviating from the scope of the present disclosure.

What is claimed is:

1. A computer-implemented method to select national programming for inclusion in informational displays, the method comprising:

identifying, by one or more computing devices, a program to be included in an informational display presented to a user;

obtaining, by the one or more computing devices, at least a first listing for the program, wherein the first listing indicates a first air time and a first content stream on which a first version of the program will be provided at the first air time, the first content stream associated with a first content distributor, the first content stream associated with a time zone associated with the user;

determining, by the one or more computing devices, whether the first version of the program is local programming or national programming based at least in part on a comparison of the first content stream with at least one other content stream that is associated with the first content distributor and the time zone associated with the user, wherein determining, by the one or more computing devices, whether the first version of the program is local programming or national programming comprises:

identifying, by the one or more computing devices, a first number of content streams associated with the first content distributor in the time zone associated with the user;

determining, by the one or more computing devices based at least in part on the plurality of listings, a percentage of the first number of content streams that include the first version of the program at the first air time; and determining, by the one or more computing devices, whether the first version of the program is local programming or national programming based at least in part on the percentage of the first number of content streams that include the first version of the program at the first air time, wherein determining, by the one or more computing devices, whether the first version of the program is local programming or national programming based at least in part on the percentage comprises:

comparing, by the one or more computing devices, the percentage to a threshold value;

determining, by the one or more computing devices, that the first version of the program is national programming when the percentage is greater than the threshold value; and determining, by the one or more computing devices, that the first version of the program is local programming when the percentage is less than the threshold value; and in response to a determination that the first version of the program is national programming, providing, by the one or more computing devices, at least a portion of the first listing for inclusion within the informational display presented to the user.

2. The computer-implemented method of claim 1, wherein:
identifying, by the one or more computing devices, the program comprises identifying, by the one or more computing devices, the program as responsive to a search query entered by the user; and
providing, by the one or more computing devices, at least the portion of the first listing for inclusion within the informational display comprises providing, by the one or more computing devices, at least the first air time and the first content distributor as a portion of a knowledge panel included in a search results page that is presented to the user.

3. The computer-implemented method of claim 1, further comprising, at least prior to comparing the percentage to the threshold value:
determining, by the one or more computing devices, the threshold value based at least in part on the first number of content streams associated with the first content distributor in the time zone associated with the user.

4. The computer-implemented method of claim 1, wherein identifying, by the one or more computing devices, the first number of content streams associated with the first content distributor in the time zone associated with the user comprises identifying, by the one or more computing devices, at least a minimum number of content streams associated with the first content distributor in the time zone associated with the user.

5. The computer-implemented method of claim 4, wherein identifying, by the one or more computing devices, at least the minimum number of content streams associated with the first content distributor in the time zone associated with the user comprises selecting, by the one or more computing devices, content streams that are associated with one or more largest consumer markets included in the time zone associated with the user until at least the minimum number of content streams have been selected.

6. The computer-implemented method of claim 1, wherein:
obtaining, by the one or more computing devices, at least the first listing comprises obtaining, by the one or more computing devices, a plurality of listings, each of the plurality of listings indicating a respective air time and a respective content stream on which a respective version of the program will be provided at the respective air time, each respective content stream associated with one of a plurality of different content distributors; and
the method further comprises, for each unique combination of air time and content distributor indicated by one or more of the plurality of listings:
identifying, by the one or more computing devices, a respective number of content streams associated with the respective content distributor in the time zone associated with the user;
determining, by the one or more computing devices, a respective percentage of the respective number of content streams that include the respective version of the program at the respective air time; and
determining, by the one or more computing devices, whether the respective version of the program is local programming or national programming based at least in part on the respective percentage of the respective number of content streams that include the respective version of the program at the respective air time, wherein at least a portion of the respective versions of the program determined to be national programming are included in the informational display.

7. The computer-implemented method of claim 6, further comprising:
filtering, by the one or more computing devices, the plurality of listings to retain only listings that indicate over the air content streams;
wherein identifying, by the one or more computing devices, the respective number of content streams associated with the respective content distributor comprises identifying, by the one or more computing device, the respective number of over the air content streams associated with the respective content distributor in the time zone associated with the user.

8. The computer-implemented method of claim 1, wherein:
obtaining, by the one or more computing devices, at least the first listing comprises obtaining, by the one or more computing devices, a plurality of listings, each of the plurality of listings indicating a respective air time and a respective content stream on which a respective version of the program will be provided at the respective air time, each respective content stream associated with one of a plurality of different content distributors; and
the method further comprises:
ordering, by the one or more computing devices, the plurality of listings based on importance, wherein listings that indicate that the corresponding program is a new episode are regarded as more important than listings that indicate that the corresponding program is a re-run episode; and
selecting, by the one or more computing devices, up to a maximum number of the listings for inclusion in the informational display according to the order.

9. A computer-implemented method to select national programming for inclusion in informational displays, the method comprising:
identifying, by one or more computing devices, a program to be included in an informational display presented to a user;
obtaining, by the one or more computing devices, at least a first listing for the program, wherein the first listing indicates a first air time and a first content stream on which a first version of the program will be provided at the first air time, the first content stream associated with a first content distributor, the first content stream associated with a time zone associated with the user, wherein obtaining, by the one or more computing devices, at least the first listing comprises obtaining, by the one or more computing devices, a plurality of listings, each of the plurality of listings indicating a respective air time and a respective content stream on which a respective version of the program will be provided at the respective air time, each respective content stream associated with one of a plurality of different content distributors;
determining, by the one or more computing devices, whether the first version of the program is local programming or national programming based at least in part on a comparison of the first content stream with at least one other content stream that is associated with the first content distributor and the time zone associated with the user;

for each unique combination of air time and content distributor indicated by one or more of the plurality of listings:
  identifying, by the one or more computing devices, a respective number of content streams associated with the respective content distributor in the time zone associated with the user;
  determining, by the one or more computing devices, a respective percentage of the respective number of content streams that include the respective version of the program at the respective air time; and
  determining, by the one or more computing devices, whether the respective version of the program is local programming or national programming based at least in part on the respective percentage of the respective number of content streams that include the respective version of the program at the respective air time, wherein at least a portion of the respective versions of the program determined to be national programming are included in the informational display; and
in response to a determination that the first version of the program is national programming, providing, by the one or more computing devices, at least a portion of the first listing for inclusion within the informational display presented to the user.

10. The computer-implemented method of claim 9, wherein:
  identifying, by the one or more computing devices, the program comprises identifying, by the one or more computing devices, the program as responsive to a search query entered by the user; and
  providing, by the one or more computing devices, at least the portion of the first listing for inclusion within the informational display comprises providing, by the one or more computing devices, at least the first air time and the first content distributor as a portion of a knowledge panel included in a search results page that is presented to the user.

11. The computer-implemented method of claim 9, wherein determining, by the one or more computing devices, whether the first version of the program is local programming or national programming comprises:
  identifying, by the one or more computing devices, a first number of content streams associated with the first content distributor in the time zone associated with the user;
  determining, by the one or more computing devices based at least in part on the plurality of listings, a percentage of the first number of content streams that include the first version of the program at the first air time; and
  determining, by the one or more computing devices, whether the first version of the program is local programming or national programming based at least in part on the percentage of the first number of content streams that include the first version of the program at the first air time.

12. The computer-implemented method of claim 11, wherein determining, by the one or more computing devices, whether the first version of the program is local programming or national programming based at least in part on the percentage comprises:
  comparing, by the one or more computing devices, the percentage to a threshold value;
  determining, by the one or more computing devices, that the first version of the program is national programming when the percentage is greater than the threshold value; and
  determining, by the one or more computing devices, that the first version of the program is local programming when the percentage is less than the threshold value.

13. The computer-implemented method of claim 12, further comprising, at least prior to comparing the percentage to the threshold value:
  determining, by the one or more computing devices, the threshold value based at least in part on the first number of content streams associated with the first content distributor in the time zone associated with the user.

14. The computer-implemented method of claim 11, wherein identifying, by the one or more computing devices, the first number of content streams associated with the first content distributor in the time zone associated with the user comprises identifying, by the one or more computing devices, at least a minimum number of content streams associated with the first content distributor in the time zone associated with the user.

15. The computer-implemented method of claim 14, wherein identifying, by the one or more computing devices, at least the minimum number of content streams associated with the first content distributor in the time zone associated with the user comprises selecting, by the one or more computing devices, content streams that are associated with one or more largest consumer markets included in the time zone associated with the user until at least the minimum number of content streams have been selected.

16. The computer-implemented method of claim 9, further comprising:
  filtering, by the one or more computing devices, the plurality of listings to retain only listings that indicate over the air content streams;
  wherein identifying, by the one or more computing devices, the respective number of content streams associated with the respective content distributor comprises identifying, by the one or more computing device, the respective number of over the air content streams associated with the respective content distributor in the time zone associated with the user.

17. The computer-implemented method of claim 9, further comprising:
  ordering, by the one or more computing devices, the plurality of listings based on importance, wherein listings that indicate that the corresponding program is a new episode are regarded as more important than listings that indicate that the corresponding program is a re-run episode; and
  selecting, by the one or more computing devices, up to a maximum number of the listings for inclusion in the informational display according to the order.

* * * * *